US010299286B2

(12) United States Patent
Kölhi et al.

(10) Patent No.: US 10,299,286 B2
(45) Date of Patent: May 21, 2019

(54) METHOD AND APPARATUS FOR MANAGING UPLINK TRAFFIC FROM A CLIENT DEVICE IN A COMMUNICATION NETWORK

(71) Applicant: Telefonaktiebolaget L M Ericsson (publ), Stockholm (SE)

(72) Inventors: Johan Kölhi, Stockholm (SE); Michael Huber, Stockholm (SE); John Orre, Stockholm (SE); Robert Skog, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 14/771,819

(22) PCT Filed: Jun. 26, 2015

(86) PCT No.: PCT/EP2015/064517
§ 371 (c)(1),
(2) Date: Sep. 1, 2015

(87) PCT Pub. No.: WO2016/206755
PCT Pub. Date: Dec. 29, 2016

(65) Prior Publication Data
US 2017/0142748 A1  May 18, 2017

(51) Int. Cl.
*H04L 29/06* (2006.01)
*H04W 28/02* (2009.01)
(Continued)

(52) U.S. Cl.
CPC ....... *H04W 72/1268* (2013.01); *H04L 47/225* (2013.01); *H04L 69/163* (2013.01); *H04W 28/0278* (2013.01); *H04W 80/06* (2013.01)

(58) Field of Classification Search
CPC ..... H04L 69/16; H04L 67/28; H04L 67/2876; H04L 69/166; H04L 47/193; H04L 69/163
See application file for complete search history.

(56) References Cited

U.S. PATENT DOCUMENTS

| | | | |
|---|---|---|---|
| 2003/0117974 A1* | 6/2003 | Kang | H04L 1/1671 370/328 |
| 2011/0007713 A1* | 1/2011 | Kobayashi | H04W 28/06 370/332 |

(Continued)

FOREIGN PATENT DOCUMENTS

WO  WO 2014/200399  12/2014

OTHER PUBLICATIONS

PCT Notification of Transmittal of the International Search Report and the Written Opinion of the International Searching Authority, or the Declaration for International application No. PCT/EP2015/064517—dated Feb. 29, 2016.

*Primary Examiner* — Jung H Park
(74) *Attorney, Agent, or Firm* — Baker Botts, LLP

(57) ABSTRACT

A method (100, 200), performed in a network node, for managing uplink traffic from a client device in a communication network is disclosed. The method comprises instructing the client device to cease sending uplink traffic on existing sessions between the client device and the network node (110), checking for expiry of a time period (130), and on expiry of the time period (140), and instructing the client device to resume sending uplink traffic on existing sessions between the client device and the network node (150).
Also disclosed are a network node (300, 400, 500) and a computer program product configured, when run on a computer, to carry out a method for managing uplink traffic from a client device in a communication network.

24 Claims, 11 Drawing Sheets

(51) Int. Cl.
*H04W 72/12* (2009.01)
*H04W 80/06* (2009.01)
*H04L 12/815* (2013.01)

(56) References Cited

U.S. PATENT DOCUMENTS

| | | | |
|---|---|---|---|
| 2011/0013516 A1* | 1/2011 | Black | H04L 43/0888 370/236 |
| 2013/0244590 A1 | 9/2013 | Nukala et al. | |
| 2014/0282810 A1 | 9/2014 | Lohmar et al. | |
| 2015/0085665 A1* | 3/2015 | Kompella | H04L 47/2483 370/236 |
| 2015/0131440 A1* | 5/2015 | Kodama | H04L 47/225 370/231 |
| 2015/0139081 A1 | 5/2015 | Chan et al. | |
| 2015/0229490 A1* | 8/2015 | Brandstatter | H04L 12/4633 370/469 |
| 2016/0345207 A1* | 11/2016 | Kwak | H04W 28/14 |

\* cited by examiner

METHOD AND APPARATUS FOR MANAGING UPLINK TRAFFIC FROM A CLIENT DEVICE IN A COMMUNICATION NETWORK

PRIORITY

This nonprovisional application is a U.S. National Stage Filing under 35 U.S.C. § 371 of International Patent Application Serial No. PCT/EP2015/064517, filed Jun. 26, 2015, and entitled "Method And Apparatus For Managing Uplink Traffic From A Client Device In A Communication Network."

TECHNICAL FIELD

The present invention relates to a method for managing uplink traffic from a client device in a communication network. The present invention also relates to a network node and to a computer program configured to carry out a method for managing uplink traffic from a client device in a communication network.

BACKGROUND

As traffic in communication networks continually increases, improving the efficiency with which radio resources are used within a communication network is an important ongoing challenge. Radio Friendly Pacing is one method for improving efficiency of resource usage, according to which TCP traffic from the communication network to client devices is sent in short bursts, as opposed to in a continuous stream. Continuous transmission not only occupies radio frequency resources but also requires the client device to continually use its radio transceiver resources for reception of the stream, leading to increased battery usage. Radio Friendly Pacing thus not only allows for more efficient use of radio resources but also saves battery on the receiving client devices. In some examples of Radio Friendly Pacing, the procedure may be implemented in a proxy which is located in the operator network and forwards network originating traffic to client devices via the appropriate radio resources. FIGS. 1 and 2 illustrate examples of proxy location within a communication network. The proxy 2 may be a transparent proxy, receiving all TCP packets for transmission from the network to the client devices 4 and also all TCP packets for transmission from the client devices 4 to the network. The proxy may for example communicate with a gateway 6, which may be in communication with a Radio Access Network (RAN) 8 via which the client devices 4 connect to the communication network. When implementing Radio Friendly Pacing, the proxy 2 receives traffic from the network in a standard fashion. The proxy then implements Radio Friendly Pacing by forwarding the received traffic in small bursts on the Downlink towards the destination client devices.

Many applications designed to run on client devices use heartbeat messages in the Uplink in order to ping their respective server, check the network connection or to poll for more data. This frequent low bandwidth traffic uses a significant amount of radio resources, and so reduces the capacity of each cell within the RAN as well as reducing the bandwidth available to other client devices in the cell. This "background" TCP traffic is typically sent by applications which are not active on the client device but merely running in the background. Such traffic may also be sent when the client device is idle but the application is still running. As the client device is the transmitting party for this background traffic, the traffic causes particularly high levels of battery usage, as well as generating a high load on the radio network, with many small pings requiring frequent state changes in the network, and so requiring a lot of signaling, placing a high load on the radio network.

SUMMARY

It is an aim of the present invention to provide methods, apparatus and computer readable media which at least partially address one or more of the challenges discussed above.

According to a first aspect of the present invention, there is provided a method, performed in a network node, for managing uplink traffic from a client device in a communication network; the method comprising instructing the client device to cease sending uplink traffic on existing sessions between the client device and the network node, checking for expiry of a time period, and, on expiry of the time period, instructing the client device to resume sending uplink traffic on existing sessions between the client device and the network node.

In some examples of the invention, the time period may be measured in seconds and may be set and updated by a network operator. In some examples, the sessions may be TCP sessions. In some examples, client device may act upon the instruction to buffer uplink traffic according to its internal procedures. For example, the client device may buffer certain traffic in a transmit buffer, and/or applications running on the client device may cease to send data to sockets associated with their ongoing sessions. In some examples, a socket API may be blocked until the instruction to cease sending uplink data is superseded. In further examples, a socket API may indicate to a running application that it is currently blocked, allowing the application to reattempt the sending of uplink data at a later time.

According to examples of the invention, the method may further comprise checking for expiry of a repeat time period, and, on expiry of the repeat time period, repeating the steps of instructing the client device to cease sending uplink traffic on existing sessions between the client device and the network node, checking for expiry of a time period, and, on expiry of the time period, instructing the client device to resume sending uplink traffic on existing sessions between the client device and the network node.

According to examples of the invention, instructing the client device to cease sending uplink traffic on existing sessions between the client device and the network node may comprise sending a TCP window control message on existing sessions between the client device and the network node, the TCP window control message specifying a TCP window size of zero.

According to examples of the invention, instructing the client device to resume sending uplink traffic on existing sessions between the client device and the network node may comprise sending a TCP window control message on existing sessions between the client device and the network node, the TCP window control message specifying a TCP window size of greater than zero.

TCP window control messages are specified in telecommunications standards, and thus according to examples of the invention may be received and processed by existing client devices without need for any additional functionality in the client devices.

According to examples of the invention, the method may further comprise, before instructing the client device to cease sending uplink traffic on existing sessions between the client device and the network node, checking a level of a buffer in the network node and, if the level exceeds a buffer threshold, withholding instruction to the client device to cease sending uplink traffic on existing sessions between the client device and the network node, and, if the level does not exceed the buffer threshold, proceeding to instruct the client device to cease sending uplink traffic on existing sessions between the client device and the network node. According to such examples, performing the method steps may thus be dependent upon a level of a buffer in the network node. If the buffer level is below a threshold, this suggests that incoming uplink traffic is background traffic which is not heavily time sensitive, and so performance of the method may be appropriate. If the buffer level exceeds a threshold, performance of the method may not be appropriate, and normal transmission may be performed with the instruction to cease sending uplink data withheld.

According to examples of the invention, the method may further comprise, if the instruction to the client device to cease sending uplink traffic on existing sessions between the client device and the network node is withheld, repeating, after the occurrence of a trigger, the steps of checking a level of a buffer in the network node and, if the level exceeds a buffer threshold, withholding instruction to the client device to cease sending uplink traffic on existing sessions between the client device and the network node, and, if the level does not exceed the buffer threshold, proceeding to instruct the client device to cease sending uplink traffic on existing sessions between the client device and the network node.

In some examples of the invention, the trigger may comprise expiry of a check time interval or receipt of an incoming data flow, thus allowing for the possibility of restarting the method when a buffer level falls below the threshold.

According to examples of the invention, the buffer may comprise a client side buffer, and the threshold may comprise a client side buffer threshold. The buffer may comprise an incoming client side buffer.

According to examples of the invention, the buffer may comprise a server side buffer and the threshold may comprise a server side threshold. The buffer may comprise an incoming server side buffer, and the method may comprise checking both buffers.

According to examples of the invention, the method may further comprise, after instructing the client device to cease sending uplink traffic on existing sessions between the client device and the network node, checking a level of at least a server side buffer in the network node, and, if the level exceeds a server side buffer threshold, instructing the client device to resume sending uplink traffic on existing sessions between the client device and the network node.

According to examples of the invention, the method may further comprise establishing a new session between the client device and the network node and determining whether uplink traffic on the new session will cause a level of a client side buffer in the network node to exceed a client side buffer threshold. The method may further comprise, if uplink traffic on the new session will cause a level of a client side buffer in the network node to exceed a client side buffer threshold, instructing the client device to resume sending uplink traffic on the new session and existing sessions between the client device and the network node, and if uplink traffic on the new session will not cause a level of a client side buffer in the network node to exceed a client side buffer threshold, instructing the client device to cease sending uplink traffic on the new session.

In some examples of the invention, the instructions may comprise TCP window control messages specifying appropriate window sizes.

According to examples of the invention, determining whether uplink traffic on the new session will cause a level of a client side buffer in the network node to exceed a client side buffer threshold may comprise receiving at least an initial packet on the new session and performing at least one of checking a level of the client side buffer, checking a rate at which a level of the client side buffer is increasing, and/or inspecting the initial packet.

According to examples of the invention, determining whether uplink traffic on the new session will cause a level of a client side buffer in the network node to exceed a client side buffer threshold may comprise checking at least one of a destination IP address of the uplink traffic on the new session, a URL of a resource requested in the new session, an HTTP Host Header field indicated in signaling establishing the new session, and/or a Server Name Indication (SNI) indicated in signaling establishing the new session.

According to examples of the invention, the method may further comprise, after instructing the client device to resume sending uplink traffic on existing sessions between the client device and the network node, receiving uplink traffic from the client device.

According to examples of the invention, the method may further comprise, after receiving uplink traffic from the client device, repeating the steps of checking a level of a buffer in the network node and, if the level exceeds a buffer threshold, withholding instruction to the client device to cease sending uplink traffic on existing sessions between the client device and the network node, and, if the level does not exceed the buffer threshold, proceeding to instruct the client device to cease sending uplink traffic on existing sessions between the client device and the network node, checking for expiry of a time period, and, on expiry of the time period, instructing the client device to resume sending uplink traffic on existing sessions between the client device and the network node. According to such examples, the method may thus comprise repeating a buffer level check after each receipt of data, thus permitting the network node to interrupt the method should its buffer level exceed the threshold.

According to examples of the invention, the method may further comprise adjusting a duration of the time period. In examples of the method, the method may further comprise adjusting a size of the TCP window, if instructing the client device to resume sending uplink traffic comprises sending a TCP window control message with a window size greater than zero.

According to examples of the invention, the method may further comprise adjusting a buffer level threshold.

In examples of the invention, the buffer level threshold, duration of time period and TCP window size may be adjusted by a network operator, for example following field testing or simulations, or may be adjusted in an automated fashion, for example via machine learning techniques.

According to examples of the invention, the network node may comprise a proxy server.

According to another aspect of the present invention, there is provided a computer program configured, when run on a computer, to carry out a method according to the first aspect of the present invention.

According to another aspect of the present invention, there is provided a computer program product comprising computer readable material having stored thereon a computer program according to the preceding aspect of the present invention.

According to another aspect of the present invention, there is provided a network node for managing uplink traffic from a client device in a communication network; the network node comprising a processor and a memory, the memory containing instructions executable by the processor such that the network node is configured to instruct the client device to cease sending uplink traffic on existing sessions between the client device and the network node, check for expiry of a time period, and on expiry of the time period, instruct the client device to resume sending uplink traffic on existing sessions between the client device and the network node.

According to another aspect of the present invention, there is provided a network node for managing uplink traffic from a client device in a communication network; the network node comprising a first instructing unit for instructing the client device to cease sending uplink traffic on existing sessions between the client device and the network node, a timer unit for checking for expiry of a time period, and a second instructing unit for, on expiry of the time period, instructing the client device to resume sending uplink traffic on existing sessions between the client device and the network node.

According to examples of the invention, the network node may further comprise a repeat unit for checking for expiry of a repeat time period, and, on expiry of the repeat time period, instructing the first instructing unit, timer unit and second instructing unit to repeat the steps of instructing the client device to cease sending uplink traffic on existing sessions between the client device and the network node, checking for expiry of a time period, and, on expiry of the time period, instructing the client device to resume sending uplink traffic on existing sessions between the client device and the network node.

According to examples of the invention, the first instructing unit may be for sending a TCP window control message on existing sessions between the client device and the network node, the TCP window control message specifying a TCP window size of zero.

According to examples of the invention, the second instructing unit may be for sending a TCP window control message on existing sessions between the client device and the network node, the TCP window control message specifying a TCP window size of greater than zero.

According to examples of the invention, the network node may further comprise a checking unit for checking a level of a buffer in the network node and, if the level exceeds a buffer threshold, for directing the first instructing unit to withhold instruction to the client device to cease sending uplink traffic on existing sessions between the client device and the network node, and if the level does not exceed the buffer threshold, for directing the first instructing unit to proceed to instruct the client device to cease sending uplink traffic on existing sessions between the client device and the network node.

In examples of the invention, the checking unit may check either or both of client side or server side buffers in the network node.

According to examples of the invention, if the checking unit directs the first instruction unit to withhold instruction to the client device to cease sending uplink traffic on existing sessions between the client device and the network node, the checking unit may also be for repeating the above functions after occurrence of a trigger.

According to examples of the invention, the checking unit may be for checking a level of at least a server side buffer in the network node after the first instructing unit has instructed the client device to cease sending uplink traffic on existing sessions between the client device and the network node, and, if the level exceeds a server side buffer threshold, for directing the second instructing unit to instruct the client device to resume sending uplink traffic on existing sessions between the client device and the network node According to examples of the invention, the network node may further comprise a session handler for establishing a new session between the client device and the network node, for determining whether uplink traffic on the new session will cause a level of a client side buffer in the network node to exceed a client side buffer threshold, and if uplink traffic on the new session will cause a level of a client side buffer in the network node to exceed a client side buffer threshold, for directing the second instructing unit to instruct the client device to resume sending uplink traffic on the new session and existing sessions between the client device and the network node, and, if uplink traffic on the new session will not cause a level of a client side buffer in the network node to exceed a client side buffer threshold, for directing the first instructing unit to instruct the client device to cease sending uplink traffic on the new session.

In examples of the invention, the session handler may determine whether uplink traffic on the new session will cause a level of a client side buffer in the network node to exceed a client side buffer threshold by receiving at least an initial packet on the new session and performing at least one of checking a level of the client side buffer, checking a rate at which a level of the client side buffer is increasing, and/or inspecting the initial packet. In further examples, the session handler may determine whether uplink traffic on the new session will cause a level of a client side buffer in the network node to exceed a client side buffer threshold by checking at least one of a destination IP address of the uplink traffic on the new session, a URL of a resource requested in the new session, an HTTP Host Header field indicated in signaling establishing the new session and/or a Server Name Indication (SNI) indicated in signaling establishing the new session.

According to examples of the invention, the network node may further comprise a receiving unit for receiving uplink traffic from the client device after the second instructing unit has instructed the client device to resume sending uplink traffic on existing sessions between the client device and the network node.

According to examples of the invention, the network node may further comprise an adjusting unit for adjusting at least one of a duration of the time period or a buffer level threshold.

In some examples of the invention, the adjusting unit may also adjust a size of the TCP window, if instructing the client device to resume sending uplink traffic comprises sending a TCP window control message with a window size greater than zero.

According to another aspect of the present invention, there is provided a proxy server comprising a network node according to the preceding aspect of the present invention.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide a method conducted in a network node, according to which a client device is instructed to cease sending Uplink (UL) traffic and then to resume sending UL traffic on expiry of a time period. An effect of the method is to impose a pause in UL traffic from the client device, so improving the efficiency of use of radio resources and saving battery resources within the client device. It will be appreciated that despite the traffic being controlled originating in the client device, the method is performed in a network node, with no need for additional client device functionality or for a dedicated client in the client device. It will also be appreciated that the method does not require the participation of any network elements upstream of the network node at which the method is performed. Thus if the network node is a proxy, the method does not require the participation of an origin server.

Figure 1:
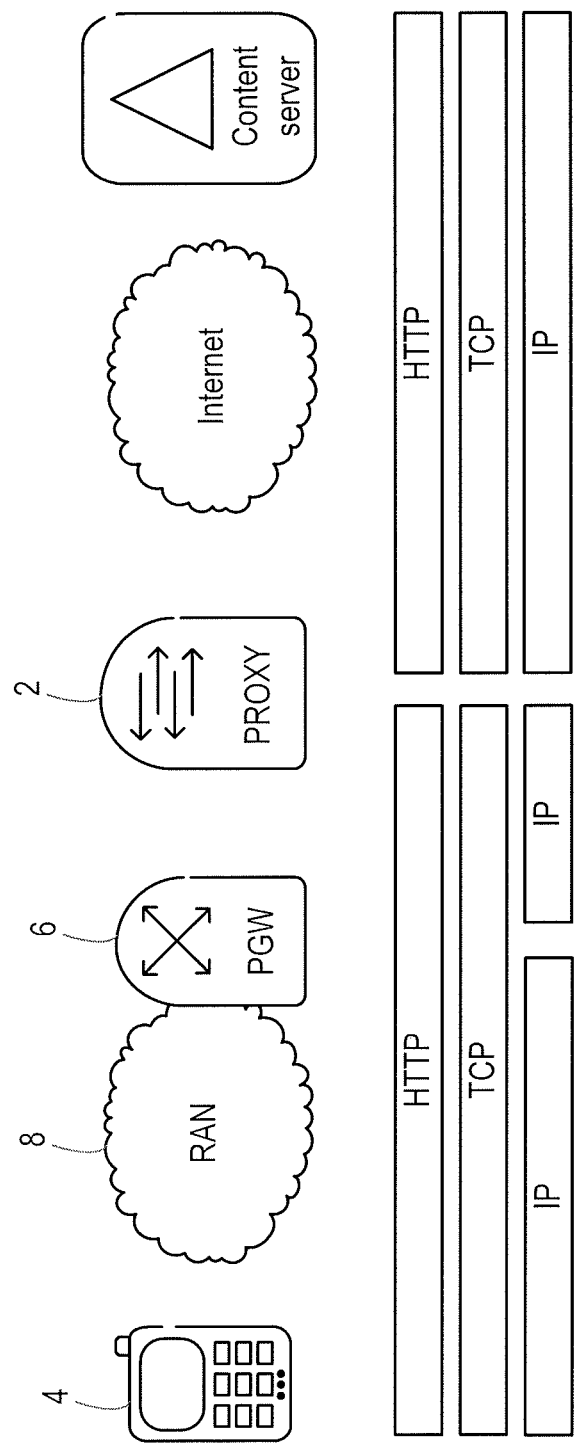
FIGS. 1 and 2 illustrate proxy location in a communication network.
Figure 2:
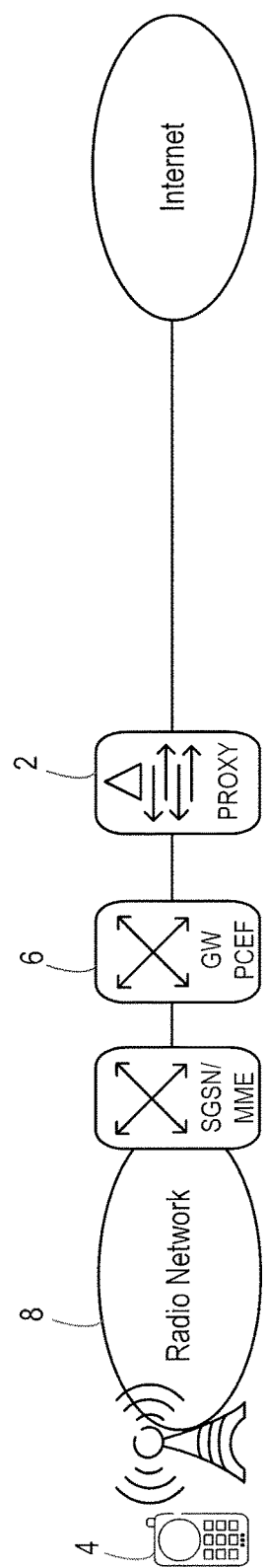
Figure 3:
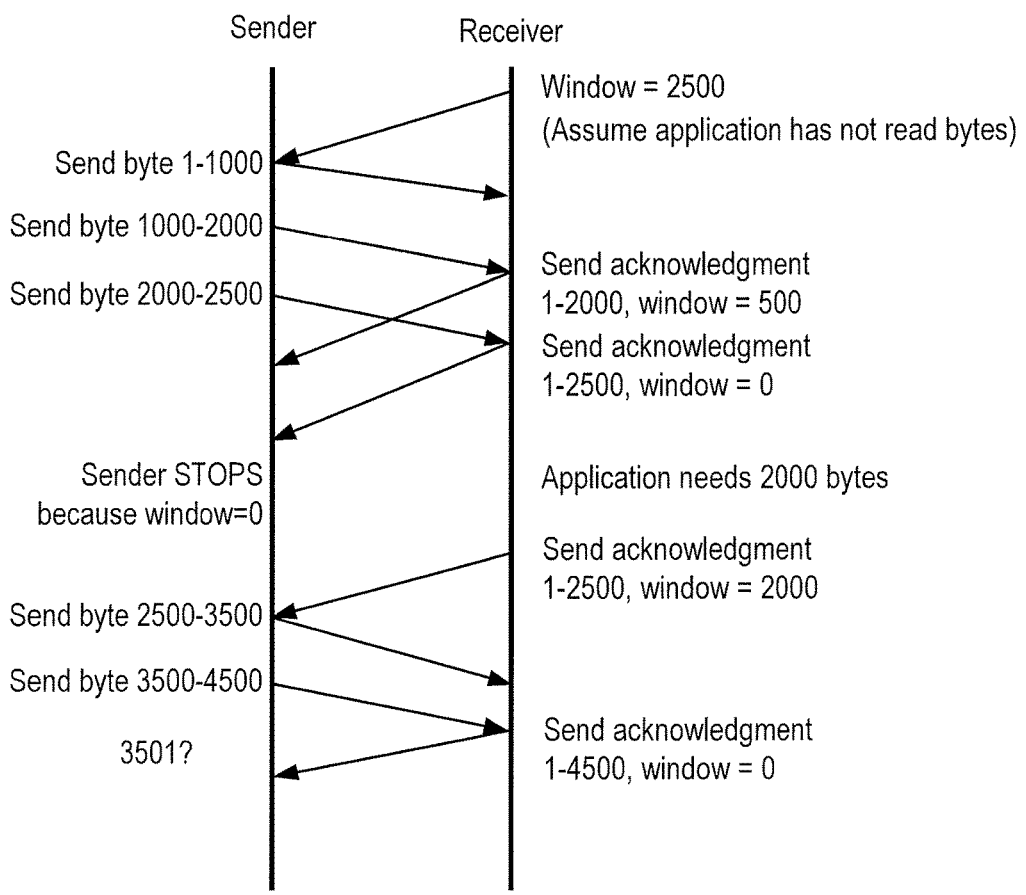
FIG. 3 illustrates signaling flow according to a TCP window control mechanism.

Some examples of the present invention may employ TCP window control messages, and a brief discussion of the TCP window control mechanism is provided below for the purposes of illustration. The TCP window control mechanism enables a receiving entity in a TCP session to indicate to a sending entity of the session the number of bytes of data that the receiving entity is able to receive from the sending entity. This number of bytes defines the size of the window that the receiving entity can currently receive, and typically corresponds to the available space in the receiving entity's receive buffer at the time of indication. Although the receive buffer may be of a fixed size, the amount of data in the receive buffer may vary over time, meaning the window size that the receiving entity can accept may also change with time. For example, if received data is acknowledged but is not immediately transferred out of the receive buffer, the receive buffer may fill up faster than the receiving entity can empty it. TCP window control messages thus allow the receiving entity to ensure that data is not sent at a faster rate than can be processed at the receiving entity. FIG. 3 illustrates signaling flow in an example TCP window control process between a sender and a receiver.

Referring to FIG. 3, the receiver is initially able to receive 2500 bytes of data in its receive buffer. The receiver thus sends a TCP window control message specifying a window size of 2500. The sender then sends the first 2500 bytes of data destined for the receiver. These may be sent in several batches, each of which is acknowledged, together with an update on the new window size available. Once all 2500 bytes have been sent, the acknowledgement message specifies a window size of 0, indicating that its receive buffer is full, and it can no longer accept new data. The sender thus stops sending data until a new TCP window control message is received. This may occur once the receiver has transferred at least some of the received 2500 bytes out of the receive buffer, allowing the destination application to process the received data. Once the receiver is ready to receive new data, a new TCP control message is sent indicating a new window size of 2000 bytes. The next 2000 bytes are then sent by the sender and acknowledged by the receiver. Examples of the present invention may make use of TCP window control messages to implement management of UL data from a client device. This is explained in further detail below with reference to FIGS. 5a and 5b.

Figure 4:
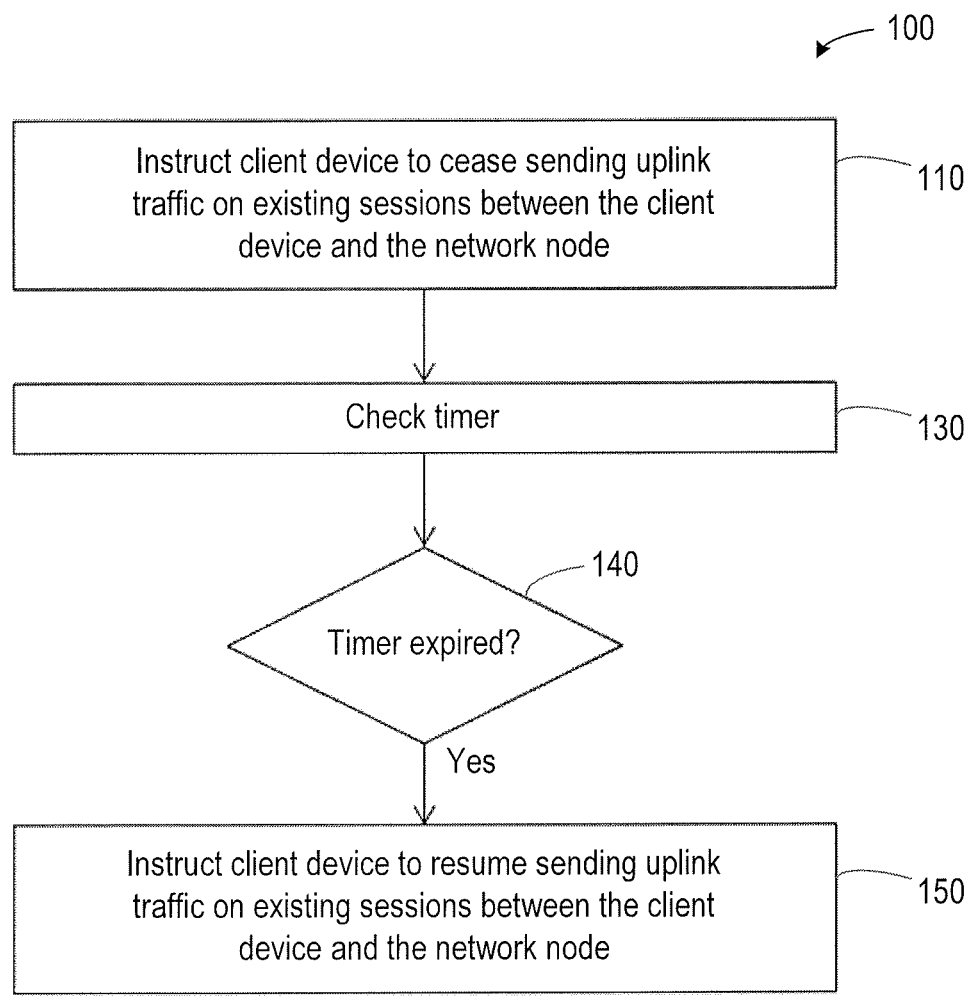
FIG. 4 is a flow chart illustrating process steps in a method for managing uplink traffic from a client device in a communication network.

FIG. 4 is a flow chart illustrating a first example of a method 100 for managing UL traffic from a client device in a communication network. The client device may for example be a mobile phone, tablet computer, set top box, laptop computer etc. The method is performed in a network node, which may for example be a proxy server such as a transparent proxy. Referring to FIG. 4, in a first step 110, the network node instructs the client device to cease sending UL traffic on existing sessions between the client device and the network node. In examples of the method, the client device may act upon the instruction to cease sending uplink traffic according to its internal procedures. For example, the client device may buffer certain traffic in a transmit buffer, and/or applications running on the client device may cease to send data to sockets associated with their ongoing sessions. In some examples, a socket API may be blocked until the instruction to buffer uplink data is superseded. In further examples, a socket API may indicate to a running application that it is currently blocked, allowing the application to reattempt the sending of uplink data at a later time.

After instructing the client device to cease sending UL traffic in step 110, the network node then checks for expiry of a time period in step 130, and, on expiry of the time period in step 140, instructs the client device to resume sending uplink traffic on existing sessions between the client device and the network node in step 150. Instructing the client device to cease sending UL traffic may be accomplished by sending a TCP window control message specifying a window size of 0, and instructing the client device to resume sending UL traffic may comprise sending a TCP window control message specifying a window size of grater than zero. In this manner, the TCP window control messages specified in existing standard documents may be used in a new way, to implement pacing of UL traffic from a client device, which pacing is implemented and controlled by a network node, such as a proxy server. It will be appreciated that, if used, the TCP window control messages are sent on the basis of a timer which controls a pause period during which no data is to be sent, even if the network node, as receiver, has sufficient buffer capacity to receive data at that time.

The method of FIG. 4 may be referred to as a Radio Uplink Pacing (RUP) procedure, and a network node implementing the procedure may be considered as operating in "RUP mode". The network node may also operate in a normal transmission mode at times when significant amounts of UL traffic are to be sent by a client device, and the network node may thus enter or exit RUP mode as appropriate. Mechanisms for entering and exiting RUP mode are discussed below, with reference to FIGS. 5a and 5b.

Figure 5A:
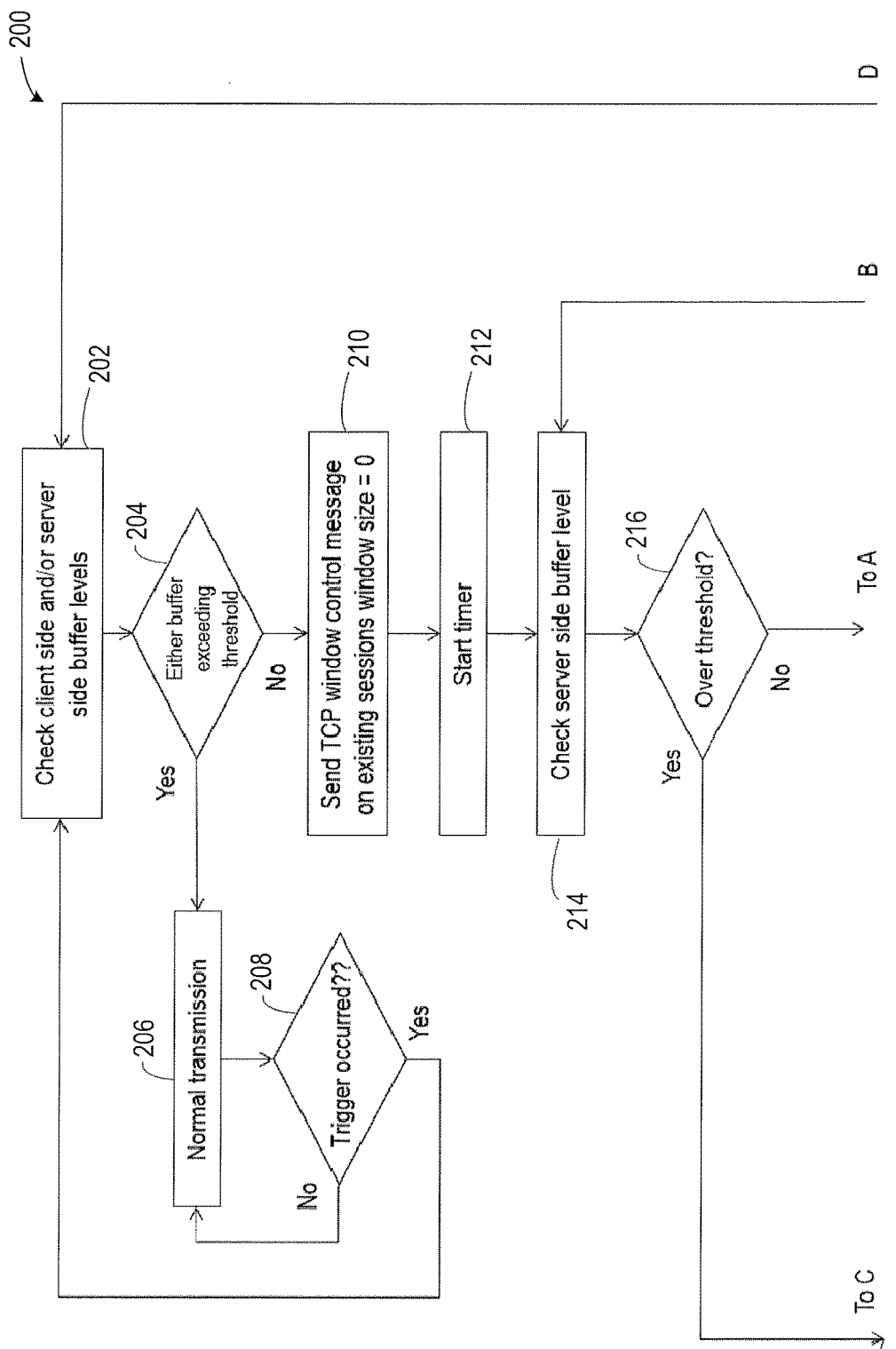
FIGS. 5a and 5b show a flow chart illustrating another example of a method for managing uplink traffic from a client device in a communication network.
Figure 5B:
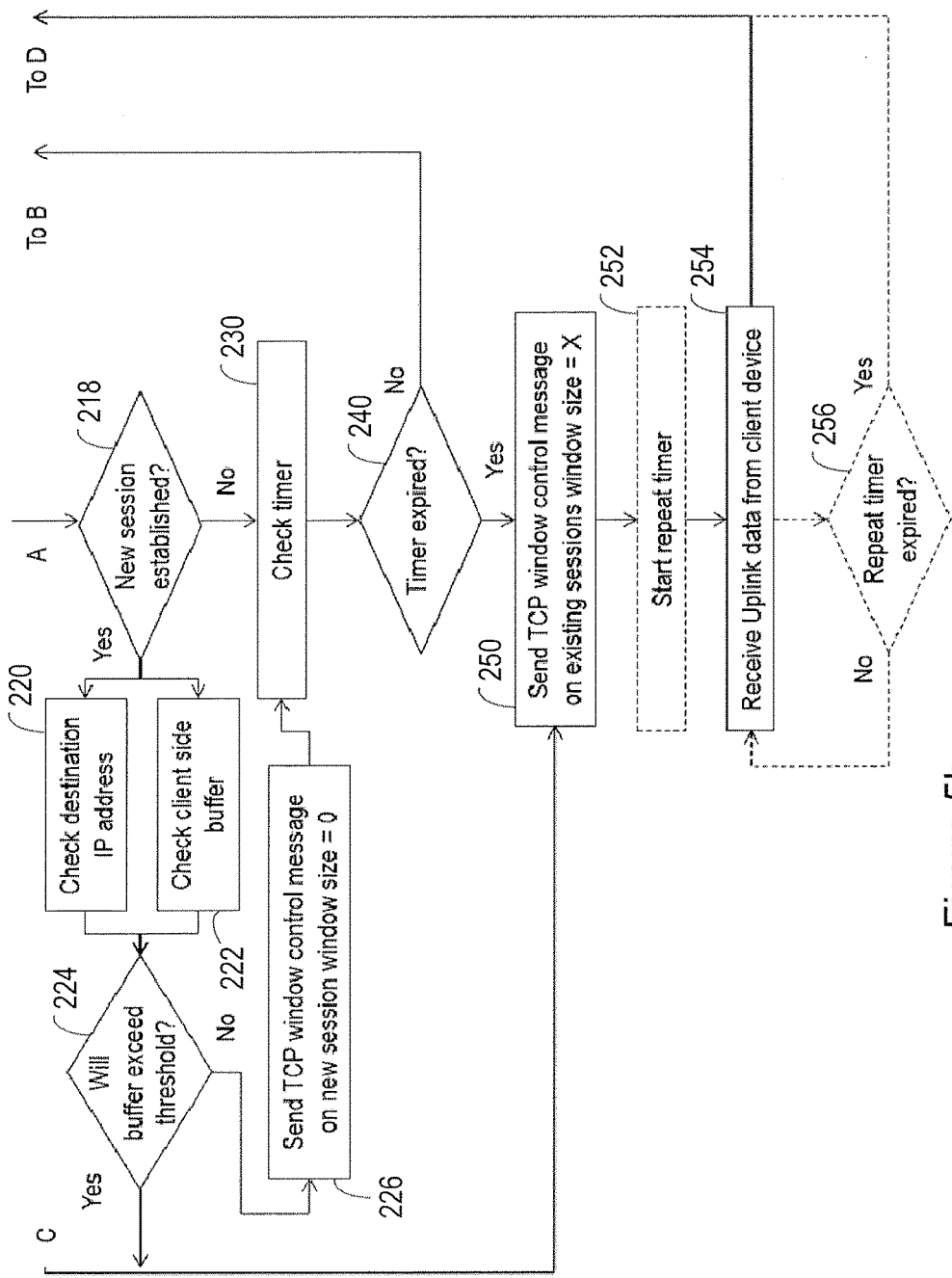

FIGS. 5a and 5b illustrate another example of a method 200 for managing UL traffic from a client device in a communication network. The method 200 illustrates one example of how the functionality of the method 100 may be implemented, as well as demonstrating additional steps which may augment the above discussed functionality. The example method 200 is described below as taking place in a transparent proxy server, but it will be appreciated that this is merely for the purposes of illustration, and the network node in which the method 200 takes place may take other forms than a transparent proxy server.

Referring to FIG. 5a, in a first step 202, a proxy checks a level of one or both of a client side buffer and a server side buffer in the proxy. The client side buffer level check may serve to ensure that the proxy client side buffer is not overly full, and thus that only background "ping-type" UL traffic is being received, and so use of the RUP procedure is appropriate. The server side buffer check may help to identify previous incoming UL data which was not background UL traffic. For example, a large amount of incoming data received at the proxy from the server side may indicate that previously received UL data was not background data but was in fact a request for download, streaming, video conference etc, meaning that use of the RUP procedure would not be appropriate.

In step 204, the proxy assesses whether or not either of the checked buffer levels exceeds a threshold level, over which the RUP procedure should not be used. The threshold levels may be different for each buffer, and may be set and updated by a network operator, or as part of an automated machine learning process as discussed in further detail below. If either buffer level is above its respective threshold, the proxy concludes that RUP procedure is not appropriate, and continues or implements normal transmission procedures at step 206. The proxy then checks for occurrence of a trigger at step 208. The trigger may for example be expiry of a check time interval or receipt of an incoming data flow. If the trigger has not yet occurred, the proxy continues to conduct normal transmission. If the trigger has occurred, then the proxy returns to step 202 to check buffer levels again in the client side and/or server side buffers. In this manner, the proxy may repeatedly check its buffer levels and start, or re-start the RUP procedure when its buffer levels fall below the appropriate thresholds.

If neither buffer is found to be exceeding its respective threshold in step 204, the proxy proceeds in step 210 to instruct client devices to cease sending UL traffic, by sending a TCP window control message on all existing sessions in step 210. The TCP window control message specifies a window size of 0, causing the client devices receiving the message to cease sending UL traffic on the sessions for which the TCP control message is received. The client devices act upon the received TCP window control message according to their internal procedures. For example, client devices may buffer their UL traffic in a client device transmit buffer, and/or applications running on the client devices may cease to send data to sockets associated with their ongoing sessions. In some examples, a socket API may be blocked until the instruction to cease sending uplink data is superseded. In further examples, a socket API may indicate to a running application that it is currently blocked, allowing the application to reattempt the sending of uplink data at a later time. The existing sessions may be TCP sessions, and the proxy may have multiple existing TCP sessions with multiple different client devices. The proxy sends a TCP control message with window size=0 on all of the existing TCP sessions, ensuring that all UL data destined for the proxy will be ceased until further notice. This step 210 imposes the start of a pause in UL traffic, and the proxy starts a timer in step 212, which timer will control the duration of the pause.

While the pause in UL traffic is in effect, the proxy continues to take certain actions to determine whether or not the RUP procedure should be halted before the planned end of the pause. In step 214, the proxy checks a level of its server side buffer. Although UL traffic on existing sessions has been paused by the TCP control message or messages sent in step 210, data may still be received from the server side. This may be the case for example if previously received UL traffic was a request for a download, or streaming, etc. If the server side buffer level is found in step 216 to be above a server side buffer threshold, the proxy proceeds directly to step 250 (FIG. 5b), according to which a TCP window control message specifying a window size of greater than zero is sent on all existing sessions. This message allows for client devices to resume sending UL data, which is received at step 254, following which the proxy returns to the initial buffer check of 202. At this point the high buffer level identified in step 216 will cause the proxy to (re)enter a normal transmission mode in step 206, thus temporarily halting the RUP procedure.

Returning to step 216 (FIG. 5a), if the server side buffer level is not found to be above the server side buffer threshold, the proxy proceeds with its next pause time check at step 218 (FIG. 5b), in which the proxy determines whether or not a new session has been established. A new session, such as a new TCP session, may be established with the proxy by a client device regardless of the pause imposed on UL data from all existing sessions. This may be the case for example if a user having an email application running in the background opens up the email application and sends an email, or if a routine ping from the email application determines that a new email is available for download. In some examples of the invention, the establishment of a new session with the proxy by a client device may cause the proxy to proceed directly to step 218 of the method, in order to address the newly established session before continuing with the rest of the method. If the proxy determines that a new session has been established, the proxy then proceeds to determine whether or not the new session should cause the proxy to halt the RUP procedure. The proxy may use multiple different tools to make this determination, two of which are illustrated in FIG. 5b.

In a first tool illustrated at step 220, the proxy may check the destination IP address indicated by the client device in the handshake procedure for establishing the new session. Certain IP addresses may be associated only with "ping-type" traffic, and the proxy may thus be able to determine, on the basis of the destination address, that the new session relates to background traffic and should not cause a halt in the RUP procedure. Similar checks may be made for example of a URL of a resource requested in the new session, an HTTP Host Header field indicated in signaling establishing the new session and/or a Server Name Indication (SNI) indicated in signaling establishing the new session. Any of the above parameters may provide information enabling the proxy to determine that the traffic in the newly established session will be "ping-type" background traffic. Another tool, illustrated at step 222, may comprise receiving initial packets on the new session and then checking the proxy client side buffer. The level of the client side buffer or the rate at which the client side buffer is increasing may enable the proxy to determine whether or not the client side buffer level is likely to exceed its threshold as a consequence of the newly established session. If the proxy is a transparent proxy, the proxy may alternatively, or additionally, inspect the initial packets to determine the nature of the new session. Any or all of the above discussed tools may be used individually, sequentially, or in a combined fashion to enable the proxy to determine, at step 224, whether or not the new session will result in the proxy client side buffer exceeding its client side buffer threshold.

If the proxy determines that the new session will result in the proxy client side buffer exceeding its client side buffer threshold, the proxy again proceeds directly to step 250, according to which a TCP window control message specifying a window size of greater than zero is sent on all existing sessions and on the newly established session, before expiry of the timer started in step 212. This message allows for all client devices to resume sending UL data, which is received at step 254, following which the proxy returns to the initial buffer check of 202. At this point the client side buffer level will have exceeded the threshold, as predicted in step 224 and this high buffer level will cause the proxy to (re)enter a normal transmission mode in step 206, thus temporarily halting the RUP procedure.

If the proxy determines that the new session will not result in the proxy client side buffer exceeding its client side buffer threshold, the proxy then sends a TCP window control message on the newly established session in step 226, the TCP window control message specifying a window size of zero, and thus imposing the UL traffic pause that is currently in effect for all other existing sessions on the newly established session as well. With the UL traffic pause imposed for the newly established session, the proxy then proceeds to check, in step 230, the status of the pause timer which was started in step 212. The proxy also proceeds directly to the check timer step 230 from step 218, if the check at step 218 determined that no new session had been established. The time at which the pause timer is set to expire may be set by a network operator, as discussed above, and may in a typical example be set to be between a few milliseconds and a few seconds. If the proxy determines in step 240 that the pause timer has not expired, then the proxy returns to step 214 to repeat its pause time checks on its server side buffer level and any newly established sessions. If the proxy determines in step 240 that the pause timer has expired, the proxy proceeds to instruct its client devices to resume sending UL traffic by sending a TCP window control message on all existing sessions at step 250, the TCP window control message specifying a window size greater than zero. Step 250 thus effectively ends the UL pause, and starts a burst of background UL traffic from client devices having ongoing sessions with the proxy. The client devices receiving the TCP control message may proceed to send an amount of UL data traffic corresponding to the window size specified in the TCP window control message for each TCP session on which the message was received. Thus for each TCP session receiving a message with a specified window size of XX, the relevant client devices may send the first XX bytes of the UL data they have not been sending, and may for example have been buffering during the UL traffic pause.

FIG. 5b illustrates two different ways in which the duration of the UL traffic burst may be controlled. In one example, the duration of the UL traffic burst is determined by the window size specified in the TCP window control messages sent in step 250. According to this example, after sending the TCP window control messages in step 250, the proxy receives data from the client devices in step 254 and waits until an amount of data corresponding to the specified window size has been received. Once data corresponding to the specified window size has been received, the proxy simply returns to the initial buffer level check of step 202, and the process described above is repeated. According to another example, the duration of the UL traffic burst is determined by a timer. According to this example, after sending the TCP window control messages that instruct the start of the UL traffic burst in step 250, the proxy starts a repeat timer in step 252, the proxy then receives UL data from the client devices in step 254 and checks the status of the repeat timer in step 256. If the repeat timer has not yet expired, then the proxy continues to receive data. If the repeat timer has expired, then the proxy returns to the initial buffer checks, following which either the RUP procedure may be halted to allow normal transmission if appropriate, or a new UL traffic pause may be started through the sending of TCP window control messages specifying a window size of zero.

It will be appreciated that several of the parameters described above may be adjusted to control the manner in which the proxy manages UL traffic. For example, changes in the buffer threshold levels affect the conditions for starting and interrupting the RUP procedure. Changes to the timer and repeat timer durations affect the duration of the RUP UL traffic pauses and UL traffic bursts. In addition, the window size specified in TCP window control messages sent at step 250 controls the amount of UL data that each client device may transmit at a time during an RUP UL traffic burst. Each of these parameters may be set by a network operator, for example following field testing or simulations. In further examples, automated machine learning techniques may be used to manage the different parameters. In such examples, the efficiency of the proxy's management of UL data from client devices may be assessed, and appropriate parameters in the above method adjusted in order to optimise a particular condition, including for example radio resource usage efficiency, client service etc.

The method 200 of FIGS. 5a and 5b illustrates one example of how aspects of the present invention may combine the monitoring of network node buffer levels with the use of a timer, and an event handler for newly occurring sessions, in order to manage UL traffic from client devices. When the network node may conclude that the UL traffic is essentially background "ping type" traffic, which is not sensitive to network delays, the network node imposes the RUP procedure on its connected client devices, pacing the background UL traffic by imposing alternating UL traffic pauses and UL traffic bursts. The RUP procedure saves battery power in the client devices as well as making more efficient use of radio resources in the network. However, when the network node concludes that the UL traffic is not background traffic, normal transmission is implemented, ensuring that client service levels are not adversely affected.

Figure 6:
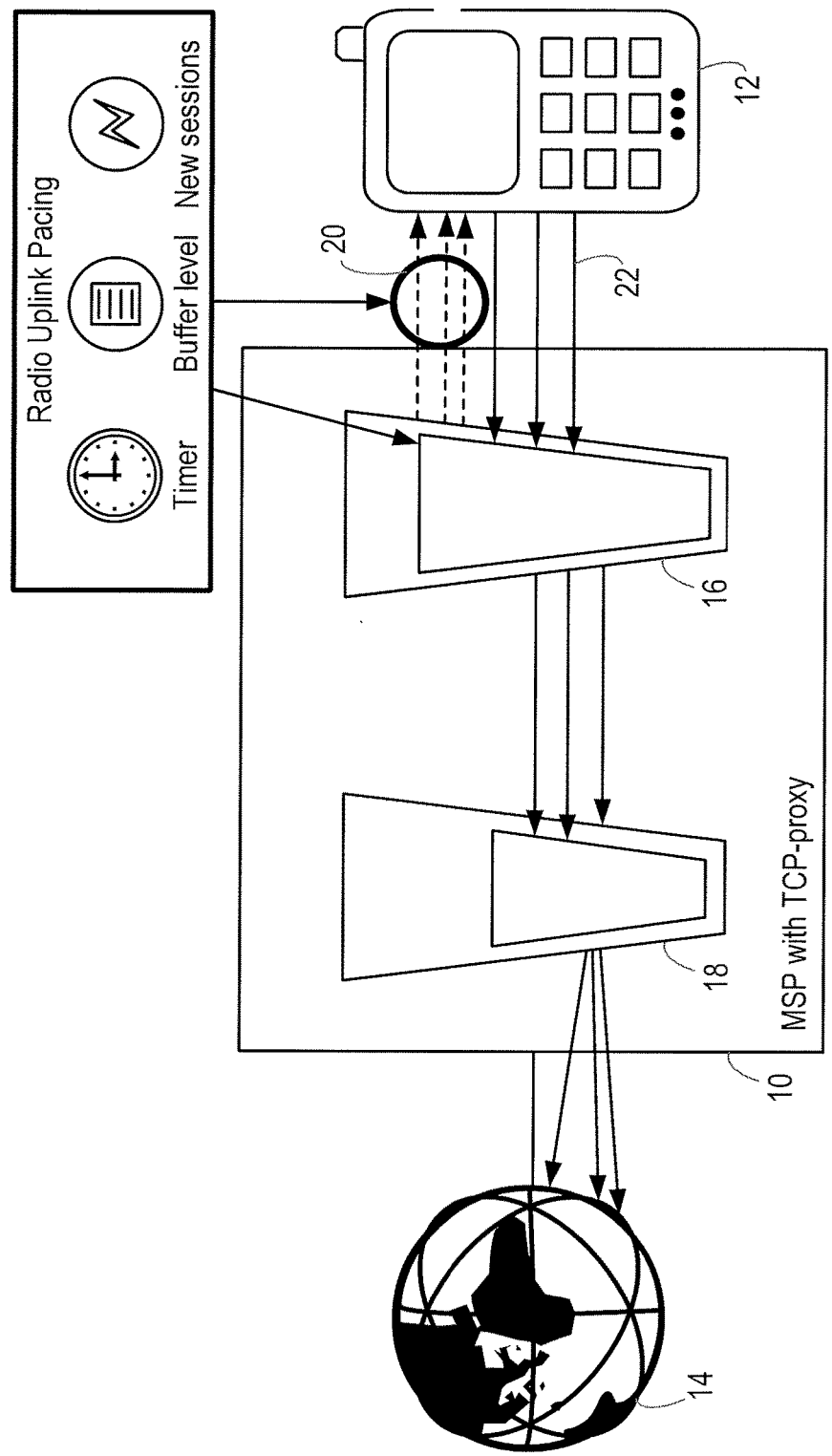
FIG. 6 is a schematic representation of operation of an example of the method of FIGS. 5a and 5b.

FIG. 6 is a schematic representation of the RUP procedure of FIGS. 5a and 5b in effect. Referring to FIG. 6, a network node 10, in the form of a transparent TCP proxy, is in communication with a client device 12 and, via the internet 14, with a plurality of servers (not shown). The network node 10 comprises a client side buffer 16 and a server side buffer 18. When operating in RUP mode, the network node 10 combines a timer, buffer monitor and new session handler to determine when to send TCP window control messages 20 to the client device, the TCP window control messages 20 instructing either the ceasing or the resuming of sending of UL traffic. When instructed to resume sending UL traffic, the client device 12 transmits data 22 to the network node 10, which is then forwarded to the correct destination via the internet 14.

Figure 7:
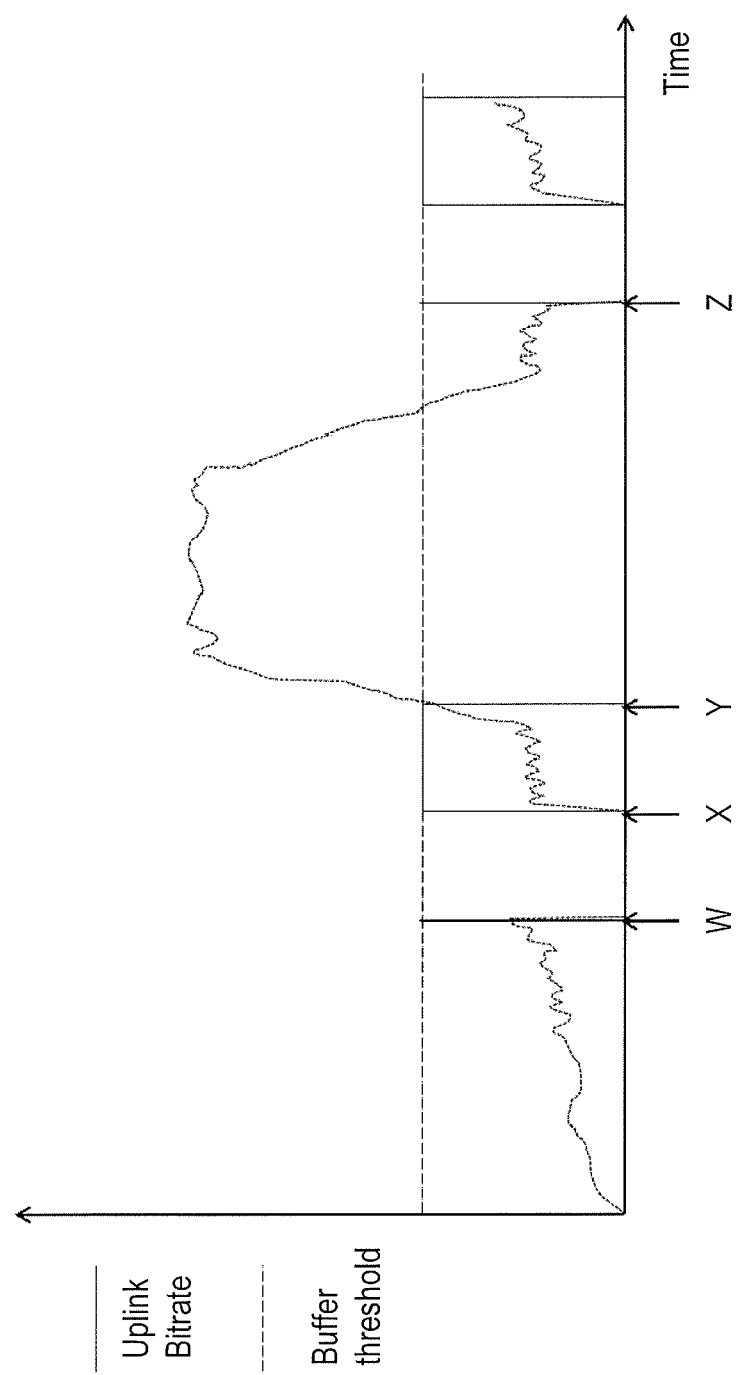
FIG. 7 is a graph illustrating uplink bitrate changes over time according to an example of the method of FIGS. 5a and 5b.

FIG. 7 illustrates how the UL bitrate received at a network node may vary as a consequence of examples of the method of the present invention. Referring to FIG. 7, before implementation of the method, uplink bitrate varies without external control. At point W, the network node instructs the beginning of an RUP UL pause, resulting in the UL bitrate reducing to zero. The pause lasts until point X, at which time the network node instructs the beginning of an RUP UL burst. Client devices then resume sending UL data until the network node buffer level reaches a threshold level at point Y, at which point the network node exits RUP mode and instructs normal data transmission. Normal transmission continues until the uplink buffer level falls back below the threshold level again. This is detected at point Z, at which point the network node re-enters RUP mode and instructs the beginning of another RUP UL pause.

Figure 8:
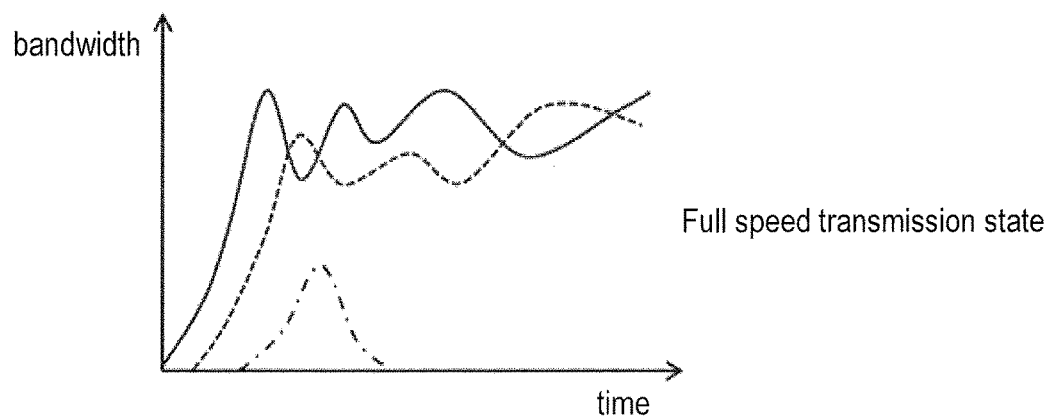
FIGS. 8 and 9 illustrate example bandwidth usage over time according to normal and pacing operation.
Figure 9:
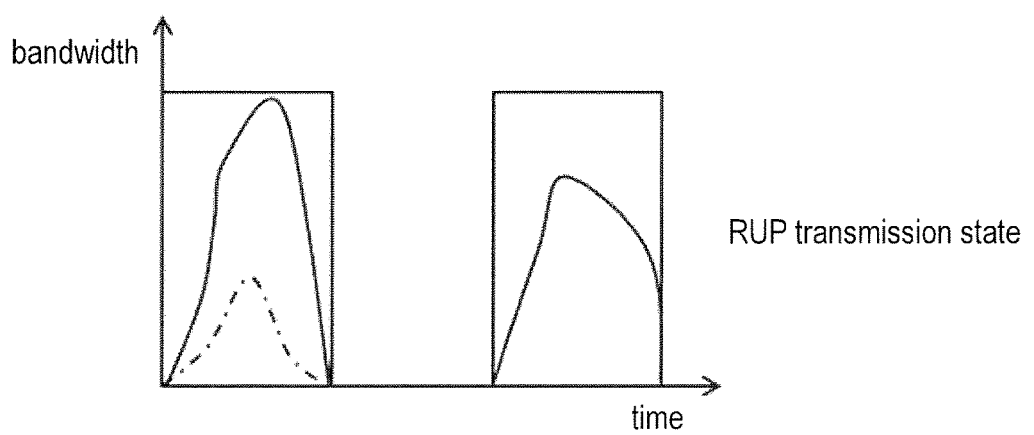

Normal transmission and RUP mode transmission bandwidth usage are illustrated in FIGS. 8 and 9. FIG. 8 illustrates bandwidth usage in normal, full speed transmission, with three TCP sessions transmitting data from the client devices. FIG. 9 illustrates bandwidth usage during RUP procedure according to examples of the present invention, with UL TCP traffic contained in RUP bursts of fixed duration.

Figure 10:
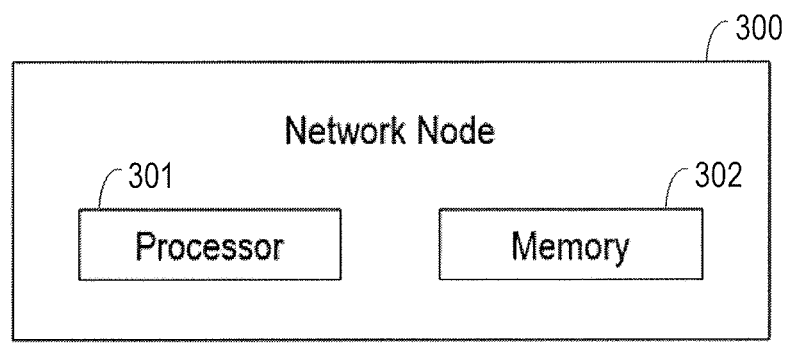
FIG. 10 illustrates functional units in a network node.

The methods of the present invention may be conducted in a network node such as a proxy server. The methods may be conducted on receipt of suitable computer readable instructions, which may be embodied within a computer program running on the network node. FIG. 10 illustrates a first example of a network node which may execute the methods of the present invention, for example on receipt of suitable instructions from a computer program. Referring to FIG. 10, the network node 300 comprises a processor 301 and a memory 302. The memory 302 contains instructions executable by the processor 301 such that the network node 300 is operative to conduct the methods 100, 200 of FIGS. 4, 5a and 5b.

Figure 11:
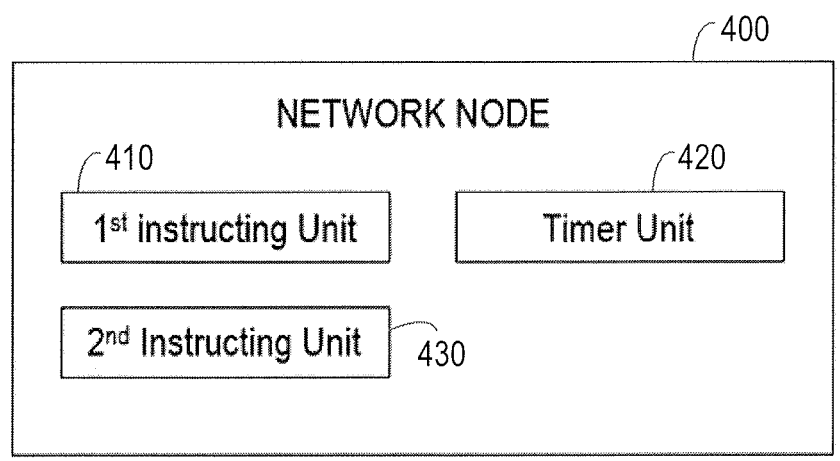
FIG. 11 illustrates functional units in another example of network node.
Figure 12:
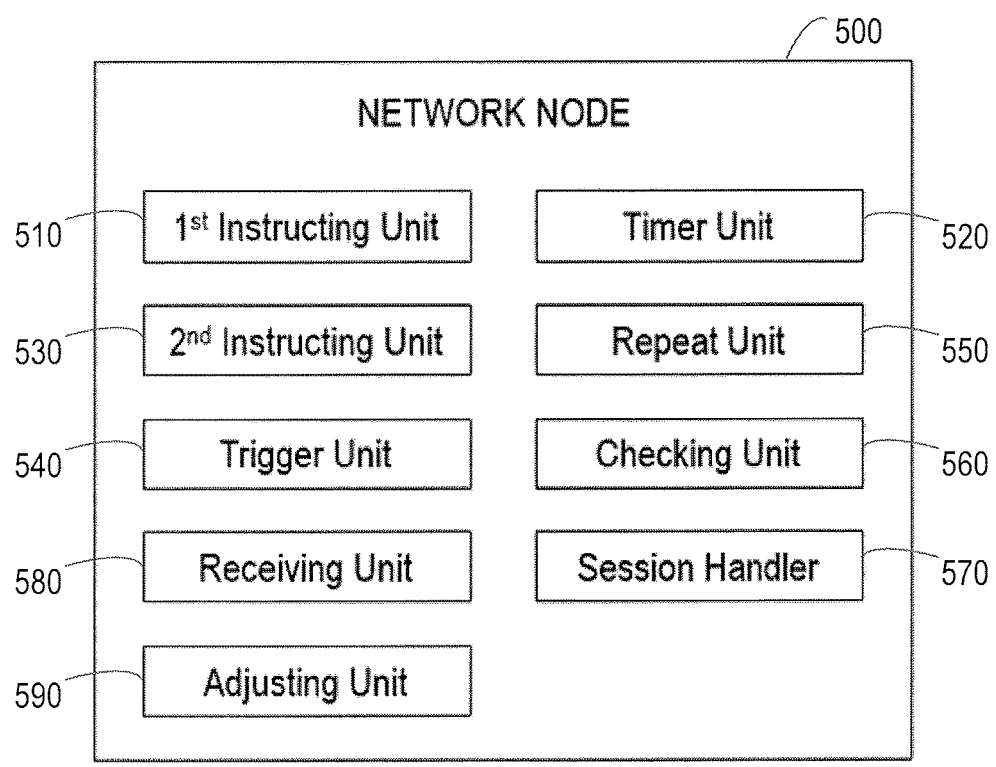
FIG. 12 illustrates functional units in another example of network node.

FIGS. 11 and 12 illustrate functional units in further embodiments of network node 400, 500 which may execute the methods 100, 200 of the present invention, for example according to computer readable instructions received from a computer program. It will be understood that the units illustrated in FIGS. 11 and 12 are functional units, and may be realised in any appropriate combination of hardware and/or software. The functional units may comprise one or more processors and one or more memories, and may be integrated to any degree.

Referring to FIG. 11, the network node 400 comprises a first instructing unit 410 for instructing a client device to cease sending uplink traffic on existing sessions between the client device and the network node. The network node 400 also comprises a timer unit 420 for checking for expiry of a time period, and a second instructing unit 430 for, on expiry of the time period, instructing the client device to resume sending uplink traffic on existing sessions between the client device and the network node. The network node may for example comprise a proxy such as a transparent proxy.

The first instructing unit 410 may be for sending a TCP window control message on existing sessions between the client device and the network node, the TCP window control message specifying a TCP window size of zero. The second instructing unit 430 may be for sending a TCP window control message on existing sessions between the client device and the network node, the TCP window control message specifying a TCP window size of greater than zero.

Referring to FIG. 12, the network node 500 comprises a first instructing unit 510, timer unit 520 and second instructing unit 530, as in the network node 400 of FIG. 11. The network node 500 also comprises a repeat unit 550 for checking for expiry of a repeat time period, and, on expiry of the repeat time period, instructing the first instructing unit 510, timer unit 520 and second instructing unit 530 to repeat the steps of instructing the client device to cease sending uplink traffic on existing sessions between the client device and the network node, checking for expiry of a time period, and, on expiry of the time period, instructing the client device to resume sending uplink traffic on existing sessions between the client device and the network node.

The network node 500 may further comprise a checking unit 560 for checking a level of a buffer in the network node and, if the level exceeds a buffer threshold, for directing the first instructing unit 510 to withhold instruction to the client device to cease sending uplink traffic on existing sessions between the client device and the network node, and if the level does not exceed the buffer threshold, for directing the first instructing unit 510 to proceed to instruct the client device to cease sending uplink traffic on existing sessions between the client device and the network node. The checking unit 560 may check either or both of client side or server side buffers in the network node. If the checking unit 560 directs the first instruction unit to withhold instruction to the client device to cease sending uplink traffic on existing sessions between the client device and the network node, the checking unit 560 may also be for repeating the above functions after occurrence of a trigger, detected by a trigger unit 540.

The checking unit 560 may also be for checking a level of at least a server side buffer in the network node 500 after the first instructing unit 510 has instructed the client device to cease sending uplink traffic on existing sessions between the client device and the network node, and, if the level exceeds a server side buffer threshold, for directing the second instructing unit 530 to instruct the client device to resume sending uplink traffic on existing sessions between the client device and the network node The network node 500 also comprises a session handler 570 for establishing a new session between the client device and the network node, for determining whether uplink traffic on the new session will cause a level of a client side buffer in the network node to exceed a client side buffer threshold, and if uplink traffic on the new session will cause a level of a client side buffer in the network node to exceed a client side buffer threshold, for directing the second instructing unit 530 to instruct the client device to resume sending uplink traffic on the new session and existing sessions between the client device and the network node, and, if uplink traffic on the new session will not cause a level of a client side buffer in the network node to exceed a client side buffer threshold, for directing the first instructing unit 510 to instruct the client device to cease sending uplink traffic on the new session.

In examples of the invention, the session handler 570 may determine whether uplink traffic on the new session will cause a level of a client side buffer in the network node to exceed a client side buffer threshold by receiving at least an initial packet on the new session and performing at least one of checking a level of the client side buffer, checking a rate at which a level of the client side buffer is increasing, and/or inspecting the initial packet. In further examples, the session handler 570 may determine whether uplink traffic on the new session will cause a level of a client side buffer in the network node to exceed a client side buffer threshold by checking at least one of a destination IP address of the uplink traffic on the new session, a URL of a resource requested in the new session, an HTTP Host Header field indicated in signaling establishing the new session, and/or a Server Name Indication (SNI) indicated in signaling establishing the new session.

The network node 500 may further comprise a receiving unit 580 for receiving uplink traffic from the client device after the second instructing unit 530 has instructed the client device to resume sending uplink traffic on existing sessions between the client device and the network node.

The network node 500 may also comprise an adjusting unit 590 for adjusting at least one of a duration of the time period or a buffer level threshold or a size of a TCP window, if instructing the client device to resume sending uplink traffic comprises sending a TCP window control message with a window size greater than zero.

The network node may for example comprise a proxy such as a transparent proxy.

Aspects of the present invention thus provide method allowing for a network node to manage Uplink traffic from a client device, so as to impose a pause in the sending of Uplink traffic. The control is effected via a method performed in the network node, without requiring any additional software or functionality in the client device. Instructions may be sent using standard TCP window control messages, which client devices are already able to process. Methods according to the present invention enable the network node to control when an application running on a client device may send data over a session, such as a TCP session, so as to impose a pacing structure, with pauses in Uplink transmission, to enable reduced signaling load and more efficient use of radio resources, and saving of battery power in the client device. The network node may switch automatically between normal, full speed transmission for high bandwidth tasks and a pacing mode for smaller, less delay sensitive background traffic.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method, performed in a network node, for managing uplink traffic from a client device in a communication network, the method comprising:
   instructing the client device to cease sending uplink traffic on existing sessions between the client device and the network node;
   starting, by the network node, a timer for controlling a duration of a pause period during which the uplink traffic on existing sessions between the client device and the network node is ceased;
   checking the timer for expiry of the pause period; and
   on expiry of the pause period, instructing the client device to resume sending uplink traffic on existing sessions between the client device and the network node;
   establishing a new session between the client device and the network node;
   determining whether uplink traffic on the new session will cause a level of a client side buffer in the network node to exceed a client side buffer threshold, and
   if uplink traffic on the new session will cause a level of a client side buffer in the network node to exceed a client side buffer threshold, instructing the client device to resume sending uplink traffic on the new session and existing sessions between the client device and the network node; and
   if uplink traffic on the new session will not cause a level of a client side buffer in the network node to exceed a client side buffer threshold, instructing the client device to cease sending uplink traffic on the new session.

2. A method as claimed in claim 1, further comprising:
   checking for expiry of a repeat time period; and
   on expiry of the repeat time period, repeating the steps of:
      instructing the client device to cease sending uplink traffic on existing sessions between the client device and the network node.

3. A method as claimed in claim 1, wherein instructing the client device to cease sending uplink traffic on existing sessions between the client device and the network node comprises sending a TCP window control message on existing sessions between the client device and the network node, the TCP window control message specifying a TCP window size of zero.

4. A method as claimed in claim 1, wherein instructing the client device to resume sending uplink traffic on existing sessions between the client device and the network node comprises sending a TCP window control message on existing sessions between the client device and the network node, the TCP window control message specifying a TCP window size of greater than zero.

5. A method as claimed in claim 1, further comprising, before instructing the client device to cease sending uplink traffic on existing sessions between the client device and the network node, checking a level of a buffer in the network node and,
   if the level exceeds a buffer threshold, withholding instruction to the client device to cease sending uplink traffic on existing sessions between the client device and the network node; and
   if the level does not exceed the buffer threshold, proceeding to instruct the client device to cease sending uplink traffic on existing sessions between the client device and the network node.

6. A method as claimed in claim 5, further comprising, if the instruction to the client device to cease sending uplink traffic on existing sessions between the client device and the network node is withheld, repeating the steps of claim 5 after occurrence of a trigger.

7. A method as claimed in claim 5, wherein the buffer comprises a client side buffer, and the threshold comprises a client side buffer threshold.

8. A method as claimed in claim 5, wherein the buffer comprises a server side buffer and the threshold comprises a server side buffer threshold.

9. A method as claimed in claim 5, further comprising adjusting a buffer level threshold.

10. A method as claimed in claim 1, further comprising, after instructing the client device to cease sending uplink traffic on existing sessions between the client device and the network node, checking a level of at least a server side buffer in the network node, and, if the level exceeds a server side buffer threshold, instructing the client device to resume sending uplink traffic on existing sessions between the client device and the network node.

11. A method as claimed in claim 1, wherein determining whether uplink traffic on the new session will cause a level of a client side buffer in the network node to exceed a client side buffer threshold comprises receiving at least an initial packet on the new session and performing at least one of:
  checking a level of the client side buffer;
  checking a rate at which a level of the client side buffer is increasing;
  inspecting the initial packet.

12. A method as claimed in claim 1, wherein determining whether uplink traffic on the new session will cause a level of a client side buffer in the network node to exceed a client side buffer threshold comprises checking at least one of:
  a destination IP address of the uplink traffic on the new session;
  a URL of a resource requested in the new session;
  an HTTP Host Header field indicated in signalling establishing the new session;
  a Server Name Indication, SNI, indicated in signalling establishing the new session.

13. A method as claimed in claim 1, further comprising, after instructing the client device to resume sending uplink traffic on existing sessions between the client device and the network node, receiving uplink traffic from the client device.

14. A method as claimed in claim 1, further comprising adjusting the duration of the pause period.

15. A non-transitory computer readable medium storing a computer program configured, when run on a computer, to carry out a method as claimed in claim 1.

16. A network node: for managing uplink traffic from a client device in a communication network, the network node comprising:
  a memory storing instructions; and
  a processor having access to the memory, the processor operable to execute the instructions to cause the processor to:
    instruct the client device to cease sending uplink traffic on existing sessions between the client device and the network node;
    start, by the network node, a timer for controlling a duration of a pause period during which the uplink traffic on existing sessions between the client device and the network node is ceased;
    check the timer for expiry of the pause period; and
    on expiry of the pause period, instruct the client device to resume sending uplink traffic on existing sessions between the client device and the network node;
    establish a new session between the client device and the network node and determine whether uplink traffic on the new session will cause a level of a client side buffer in the network node to exceed a client side buffer threshold, and:
    if uplink traffic on the new session will cause a level of a client side buffer in the network node to exceed a client side buffer threshold, instruct the client device to resume sending uplink traffic on the new session and existing sessions between the client device and the network node; and
    if uplink traffic on the new session will not cause a level of a client side buffer in the network node to exceed a client side buffer threshold, instruct the client device to cease sending uplink traffic on the new session.

17. A network node as claimed in claim 16, wherein the processor is further operable to execute the instructions to cause the processor to check for expiry of a repeat time period, and, on expiry of the repeat time period, repeat the steps of:
  instructing the client device to cease sending uplink traffic on existing sessions between the client device and the network node.

18. A network node as claimed in claim 16, wherein the processor is further operable to execute the instructions to cause the processor to send a TCP window control message on existing sessions between the client device and the network node, the TCP window control message specifying a TCP window size of zero.

19. A network node as claimed in claim 16, wherein the processor is further operable to execute the instructions to cause the processor to send a TCP window control message on existing sessions between the client device and the network node, the TCP window control message specifying a TCP window size of greater than zero.

20. A network node as claimed in claim 16, the processor is further operable to execute the instructions to cause the processor to:
  check a level of a buffer in the network node;
  if the level exceeds a buffer threshold, withhold instruction to the client device to cease sending uplink traffic on existing sessions between the client device and the network node; and
  if the level does not exceed the buffer threshold, instruct the client device to cease sending uplink traffic on existing sessions between the client device and the network node.

21. A network node as claimed in claim 20, wherein, if the processor withholds instruction to the client device to cease sending uplink traffic on existing sessions between the client device and the network node, the processor repeats the functions of claim 20 after occurrence of a trigger.

22. A network node as claimed in claim 16, wherein the processor is further operable to execute the instructions to cause the processor to:
  check a level of at least a server side buffer in the network node after instructing the client device to cease sending uplink traffic on existing sessions between the client device and the network node, and,
  if the level exceeds a server side buffer threshold, instruct the client device to resume sending uplink traffic on existing sessions between the client device and the network node.

23. A network node as claimed in claim 16, wherein the processor is further operable to execute the instructions to cause the processor to receive uplink traffic from the client device after the processor has instructed the client device to resume sending uplink traffic on existing sessions between the client device and the network node.

24. A network node as claimed in claim 16, wherein the processor is further operable to execute the instructions to cause the processor to adjust at least one of a duration of the time period or a buffer level threshold.

* * * * *